US009331490B2

(12) United States Patent
Yin et al.

(10) Patent No.: US 9,331,490 B2
(45) Date of Patent: May 3, 2016

(54) VOLTAGE-APPLICATION DRIVE SYSTEMS AND VOLTAGE-APPLICATION METHOD THEREOF

(71) Applicant: Shenzhen China Star Optoelectronics Technology Co., Ltd., Shenzhen, Guangdong (CN)

(72) Inventors: Chonghui Yin, Shenzhen (CN); Wen-Pin Chiang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 714 days.

(21) Appl. No.: 13/643,536

(22) PCT Filed: Oct. 19, 2012

(86) PCT No.: PCT/CN2012/083237
§ 371 (c)(1),
(2) Date: Oct. 25, 2012

(87) PCT Pub. No.: WO2014/056250
PCT Pub. Date: Apr. 17, 2014

(65) Prior Publication Data
US 2014/0103717 A1  Apr. 17, 2014

(51) Int. Cl.
*H02J 3/14* (2006.01)
*H02J 4/00* (2006.01)
*G09G 3/36* (2006.01)

(52) U.S. Cl.
CPC ............... *H02J 4/00* (2013.01); *G09G 3/3696* (2013.01); *G09G 2330/02* (2013.01); *Y10T 307/406* (2015.04)

(58) Field of Classification Search
CPC ..... H02J 4/00; G09G 3/3696; G09G 2330/02; Y10T 307/406
USPC ............ 307/31, 112, 113, 115, 116, 126, 130
See application file for complete search history.

(56) References Cited

U.S. PATENT DOCUMENTS 7,301,519 B2 * 11/2007 Kim ..................... G09G 3/3696
345/100
2008/0259065 A1 * 10/2008 Wright et al. ................. 345/205
(Continued)

FOREIGN PATENT DOCUMENTS

CN     1670576 A    9/2005
CN    102662264 A   9/2012
(Continued)

Primary Examiner — Rexford Barnie
Assistant Examiner — Rasem Mourad
(74) Attorney, Agent, or Firm — Andrew C. Cheng

(57) ABSTRACT

The present invention provides a voltage-application drive system, including a power module, a switching module and a voltage-application module, wherein the switching module including a plurality of switches and the voltage-application module including a plurality of voltage-application units; switching module receiving selection of voltage driver manner from user and controlling the plurality of switches and selectively supplying drive voltage according to the selection of voltage-application drive manner; the voltage-application unit receiving the drive voltage and converting the drive voltage into voltage required by the selection of voltage-application drive manner. As such, the present invention can reduce manufacturing cost, improve production efficiency and improve the flexibility of manufacturing process.

13 Claims, 3 Drawing Sheets

(56) References Cited

U.S. PATENT DOCUMENTS

| | | | |
|---|---|---|---|
| 2009/0228722 A1* | 9/2009 | Lin | H04L 12/10 713/300 |
| 2010/0141594 A1* | 6/2010 | Kim | G06F 3/03545 345/173 |
| 2010/0307840 A1* | 12/2010 | Kobayashi | G06F 3/0416 178/18.06 |
| 2010/0308739 A1* | 12/2010 | Shteynberg | H05B 33/083 315/193 |
| 2011/0012881 A1* | 1/2011 | Chang | G09G 5/18 345/211 |

FOREIGN PATENT DOCUMENTS

| | | |
|---|---|---|
| JP | 3604511B2 B2 | 2/1998 |
| JP | 3604511 B2 * | 12/2004 |

* cited by examiner

VOLTAGE-APPLICATION DRIVE SYSTEMS AND VOLTAGE-APPLICATION METHOD THEREOF

BACKGROUND OF THE INVENTION

1. Field of the Invention

The present invention relates to the field of liquid crystal displaying techniques, and in particular to a voltage-application drive system and voltage-application method thereof.

2. The Related Arts

Optical alignment technique is to apply voltage to liquid crystal substrate through ultraviolet (UV) rays irradiation to enable the monomers in the polymers in liquid crystal (LC) panel to react to achieve LC alignment. The layouts of the substrates of different products are different, and the driving methods of applying voltage are also different.

Referring to FIG. 1, FIG. 1 is a schematic view showing the structure of a known voltage-application system. As shown in FIG. 1, the known voltage-application system 10 comprises a control module 11, a power module 12 and a voltage-application module 13, wherein the voltage-application module 13 applies the voltage to the substrate to drive.

However, in the known technique, the voltage-application module 13 can only apply voltage to one or two designs of substrates to drive, which limits the changes of drive method and reduces the flexibility of manufacturing process. Furthermore, different drive method of voltage application is used for different substrate. Therefore, a plurality of voltage-application modules 13 must be purchased to perform voltage application drive for substrates of different designs. As the price of voltage-application module 13 is around 30,000 US dollars and requires 2-3 hours to change the voltage-application modules 13, the cost is increased and the production efficient is lowered.

SUMMARY OF THE INVENTION

The technical issue to be addressed by the present invention is to provide a voltage-application drive system and voltage-application method thereof, to reduce manufacturing cost and improve production efficiency as well as improve flexibility of manufacturing process.

The present invention provides a voltage-application drive system, which comprises: a power module, a switching module and a voltage-application module; wherein the switching module comprising switch unit and the switching unit comprising a plurality of switches, touch control unit and control unit, the switch comprising input terminal and output terminal, with input terminal connected to power module and the output terminal connected to voltage-application module, the control unit being connected to the touch control unit and the switch unit; the voltage-application module comprising a plurality of voltage-application units same as number of the switches; wherein the power module being for supplying drive voltage, the touch control unit for receiving selection of voltage-application drive manner inputted by user, the control unit controlling the ON and OFF of the switches according to the election of voltage-application drive manner to selectively supply drive voltage to voltage-application units; the voltage-application units for receiving drive voltage and converting the drive voltage to voltage required by the voltage-application drive manner.

According to a preferred embodiment of the present invention, the control unit stores a plurality of voltage-application drive manners.

According to a preferred embodiment of the present invention, the plurality of voltage-application units and the plurality of switches are electrically connected in a one-on-one manner.

According to a preferred embodiment of the present invention, the voltage required by the voltage-application drive manner comprises: floating, ground (GND), AC, DC, synchronous AC and synchronous DC.

According to a preferred embodiment of the present invention, the voltage-application units comprise a floating voltage-application unit, a GND voltage-application unit, an AC voltage-application unit, a DC voltage-application unit, a synchronous AC voltage-application unit and a synchronous DC voltage-application unit.

The present invention provides a voltage-application drive system, which comprises: a power module, a switching module and a voltage-application module; wherein the switching module comprising switch unit and the switching unit comprising a plurality of switches; the voltage-application module comprising a plurality of voltage-application units same as number of the switches; wherein the power module being for supplying drive voltage, the switching module being connected to power module and voltage-application module respectively, the switching module being for receiving selection of voltage-application drive manner inputted by user and controlling the ON and OFF of the switches according to the election of voltage-application drive manner to selectively supply drive voltage to voltage-application units; the voltage-application units for receiving drive voltage and converting the drive voltage to voltage required by the voltage-application drive manner.

According to a preferred embodiment of the present invention, the switch comprises an input terminal and an output terminal, with input terminal connected to power module and the output terminal connected to voltage-application module; when the input terminal and the output terminal are conducted, the switch outputs drive voltage, and when the input terminal and the output terminal are cut off, the switch ahs not output.

According to a preferred embodiment of the present invention, the switching module further comprises a touch control unit, for receiving selection of voltage-application drive manner inputted by user, According to a preferred embodiment of the present invention, the switching module further comprises a control unit, electrically connected to the touch control unit and the switches, the control unit receives selection of voltage-application drive manner inputted by user and controlling the ON and OFF of the switches according to the election of voltage-application drive manner to selectively supply drive voltage to voltage-application units.

According to a preferred embodiment of the present invention, the control unit stores a plurality of voltage-application drive manners.

According to a preferred embodiment of the present invention, the plurality of voltage-application units and the plurality of switches are electrically connected in a one-on-one manner.

According to a preferred embodiment of the present invention, the voltage required by the voltage-application drive manner comprises: floating, ground (GND), AC, DC, synchronous AC and synchronous DC.

According to a preferred embodiment of the present invention, the voltage-application units comprise a floating voltage-application unit, a GND voltage-application unit, an AC voltage-application unit, a DC voltage-application unit, a synchronous AC voltage-application unit and a synchronous DC voltage-application unit.

The present invention provides a voltage-application method of a voltage-application drive system, the voltage-application system comprising a plurality of switches, the method comprises the steps of: supplying drive voltage; obtaining selection of voltage-application drive manner; controlling the plurality of switches and selectively supplying drive voltage according to the selection of voltage-application drive manner; and receiving drive voltage and converting drive voltage to voltage required by the voltage-application drive manner.

According to a preferred embodiment of the present invention, the method further comprises a step of storing a plurality of voltage-application drive manner before the step of controlling the plurality of switches and selectively supplying drive voltage according to the selection of voltage-application drive manner.

According to a preferred embodiment of the present invention, the voltage required by the voltage-application drive manner comprises: floating, ground (GND), AC, DC, synchronous AC and synchronous DC.

The efficacy of the present invention is that to be distinguished from the state of the art. The voltage-application drive system of the present invention comprises a power module, a switching module and a voltage-application module, wherein the switching module comprises a plurality of switches and the voltage-application module comprises a plurality of voltage-application units; switching module receiving selection of voltage driver manner from user and controlling the plurality of switches and selectively supplying drive voltage according to the selection of voltage-application drive manner; the voltage-application unit receiving the drive voltage and converting the drive voltage into voltage required by the selection of voltage-application drive manner. As such, the present invention can automatically switch to different voltage-application drive manner according to different selections from users. Therefore, it is not necessary to purchase a plurality of voltage-application modules so as to reduce manufacturing cost, improve production efficiency and improve the flexibility of manufacturing process.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following description refers to drawings and embodiments of the present invention.

Figure 1:
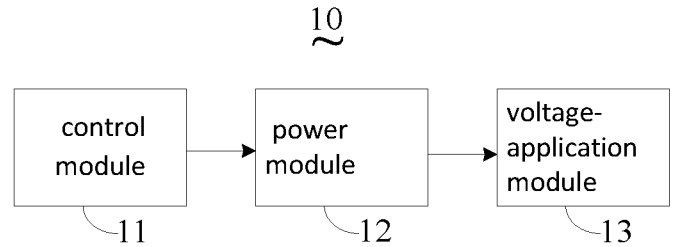
FIG. 1 is a schematic view showing the structure of a known voltage-application drive system.
Figure 2:
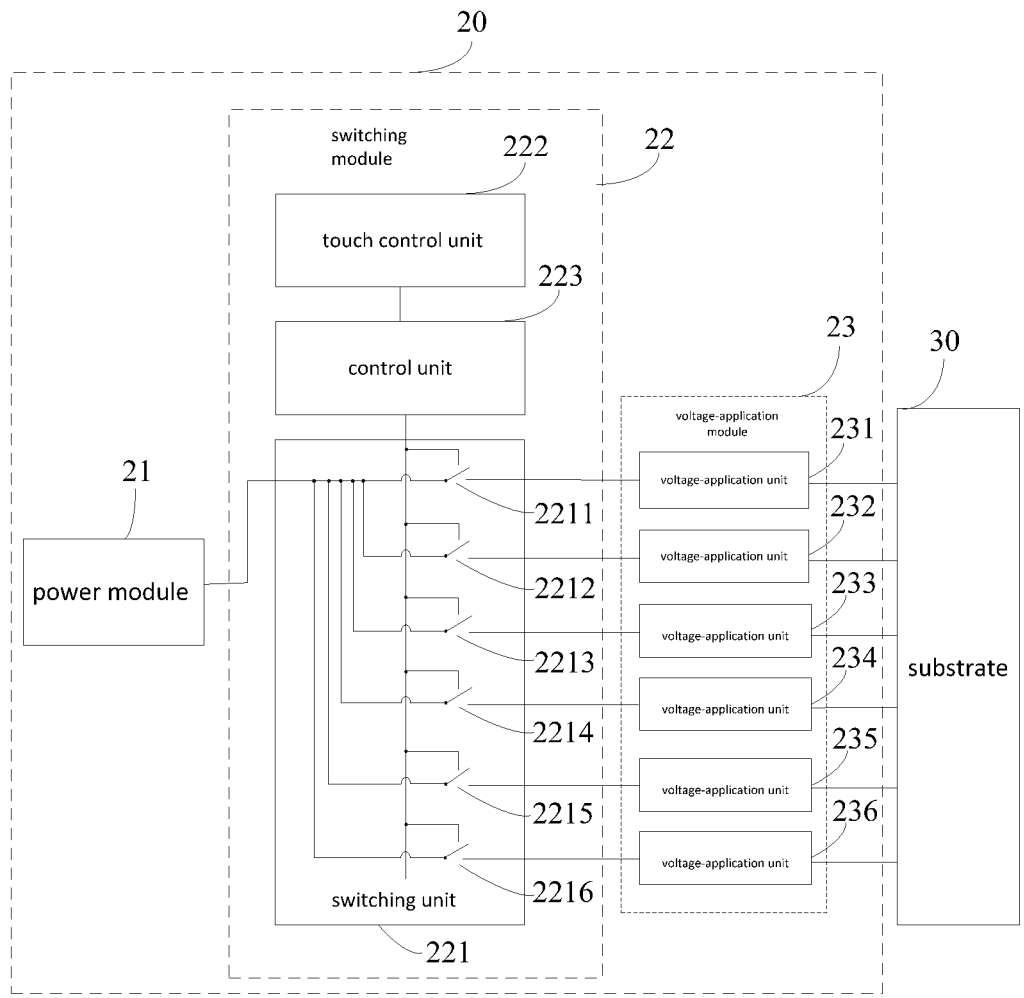
FIG. 2 is a schematic view showing the structure of the voltage-application drive system of the first embodiment applied to a substrate according to the present invention.

Referring to FIG. 2, FIG. 2 is a schematic view showing the structure of the voltage-application drive system of the first embodiment applied to a substrate according to the present invention. As shown in FIG. 2, a voltage-application drive system 20 of the present invention comprises a power module 21, a switching module 22 and a voltage-application module 23, wherein switching module 22 comprises switch unit 221. The switch unit 221 comprises a plurality of switches, shown as switches 2211-2216 in FIG. 2. The voltage-application module 23 comprises a plurality of voltage-application units, shown as voltage-application units 231-236 in FIG. 2. The number of voltage-application units is the same as the number of switches.

In the instant embodiment, the power module 21 is for supplying drive voltage. The switching module 22 is electrically connected to power module 21 and voltage-application module 23 respectively. The switching module 22 receives selection of voltage driver manner from user and controls the plurality of switches 2211-2216 and selectively supplying drive voltage to voltage-application units 231-236 according to the selection of voltage-application drive manner. The voltage-application units 231-236 respectively receives drive voltage and convert the drive voltage into voltage required by the selection of voltage-application drive manner.

As such, the voltage-application drive system 20 of the present invention can automatically switch to different voltage-application drive manner according to different selections from users. Therefore, it is not necessary to purchase a plurality of voltage-application modules so as to reduce manufacturing cost, improve production efficiency and improve the flexibility of manufacturing process.

The switching module 22 of the present invention further comprises a touch control unit 222 and a control unit 223. In the instant embodiment, the touch control unit 222 is for the user to input the selection of voltage-application drive manner. The present embodiment comprises a plurality of selections of voltage-application drive manner in default and the user can select or update accordingly. The control unit 223 is electrically connected to touch control unit 222 and switch unit 221 respectively. The control unit 223 controls ON and OFF of the plurality of switches 2211-2216 and selectively supplying drive voltage to voltage-application units 231-236 according to the selection of voltage-application drive manner.

In the instant embodiment, each of switches 2211-2216 comprises an input terminal, an output terminal and a control terminal wherein the control terminal is electrically connected to control unit 223, the input terminal is electrically connected to power module 21 and the output terminal is electrically connected to voltage-application module 23.

In the instant embodiment, each of switches 2211-2216 is electrically connected to each of voltage-application units 231-236 respectively. Specifically, the output terminal of switch 2211 is electrically connected to voltage-application unit 231, the output terminal of switch 2212 is electrically connected to voltage-application unit 232, the output terminal of switch 2213 is electrically connected to voltage-application unit 233, the output terminal of switch 2214 is electrically connected to voltage-application unit 234, the output terminal of switch 2215 is electrically connected to voltage-application unit 235, and the output terminal of switch 2216 is electrically connected to voltage-application unit 236. When the output terminal and the input terminal are conductive, switch 2211-2216 is in an ON state, and a drive voltage is outputted. When the output terminal and the input terminal are cut off, switch 2211-2216 is in an OFF state, and no drive voltage is outputted.

Therefore, specifically, the control unit 23 uses the control terminals of switches 2211-2216 to control the ON and OFF of switches 2211-2216 to selectively supply drive voltage to voltage-application units 231-236.

In the instant embodiment, the control unit 223 stores a plurality of voltage-application drive manners, preferably, 5-7 voltage-application drive manners. When different voltage-application drive manner is required, the switching of voltage-application drive manner can be performed through the control unit 223 without replacing voltage-application module 23. Therefore no additional purchase of voltage-application module 23 is required. Also, no replacement of connections between voltage-application module 23 and other modules is required so as to reduce cost and improve production efficiency.

In the instant embodiment, the voltage-application drive manner comprises the voltage required by the voltage-application drive manner, which comprises: floating, ground (GND), AC, DC, synchronous AC and synchronous DC.

In the instant embodiment, voltage-application units 231-236 /convert the drive voltage into the voltage required by the voltage-application drive manner. The voltage-application units 231-236 comprise a floating voltage-application unit, a GND voltage-application unit, an AC voltage-application unit, a DC voltage-application unit, a synchronous AC voltage-application unit and a synchronous DC voltage-application unit. In the instant embodiment, voltage-application unit 231 is a floating voltage-application unit, voltage-application unit 232 is a GND voltage-application unit, voltage-application unit 233 is an AC voltage-application unit, voltage-application unit 234 is a DC voltage-application unit, voltage-application unit 235 is a synchronous AC voltage-application unit and voltage-application unit 236 is a synchronous DC voltage-application unit. Therefore, the voltage-application units 231-236 supply the voltages required by the voltage-application drive manner, comprising floating, ground (GND), AC, DC, synchronous AC and synchronous DC.

In the instant embodiment, the voltage-application drive system 20 is applied to a substrate 30. Specifically, the voltage-application drive system 20 supplies the required voltage to substrate 30.

Figure 3:
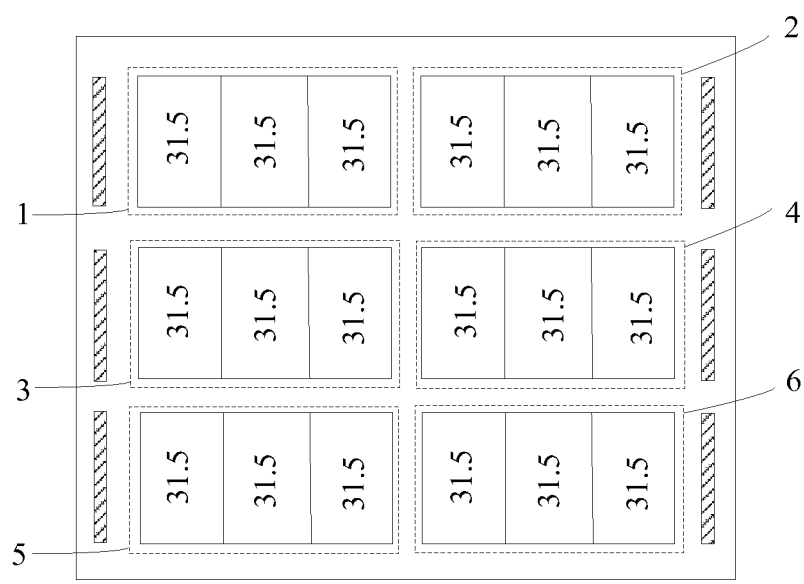
FIG. 3 is a schematic view showing a specific voltage-application driver manner.

As shown in FIG. 3, the voltage-application drive of a 31.5" substrate 30 is divided into six groups, shown as groups 1-6. Each group is formed by arranged R (Red)/G (green)/B (Blue)/Odd/Even/CF (CFcom)/Array corn (Acorn) signals, wherein the R/G/B/Odd/Even/CF/Array corn signals are the curing pads on surface of substrate 30. Different curing of substrate 30 of different layout design requires different drive manner. Table 1 lists voltages corresponding to the R/G/B/Odd/Even/CF/Array corn signals of five types of voltage-application manners.

| Voltage-application Drive manner | R | G | B | Odd | Even | Acom | CF |
|---|---|---|---|---|---|---|---|
| 1 | | Floating | | GND | | AC | GND |
| 2 | | | | GND | | | DC |
| 3 | | | | GND | | | Synchronous AC |
| 4 | | GND | | DC | | | Synchronous AC |
| 5 | | GND | | DC | | | DC |

When a user selects different voltage-application manner based on different layout design of substrate 30, voltage-application drive system 20 automatically switches voltage-application drive manner to supply corresponding drive voltage to substrate 30.

When substrate 30 uses the first voltage-application manner of table 1, then the user selects the first voltage-application manner in table 1. The touch control unit 222 receives the selection of the first voltage-application manner inputted by the user and transmits the selected voltage-application manner to the control unit 223. According to the stored voltage-application manner, the control unit 223 determines that the voltage distribution required by the first voltage-application manner is R1G/B signals requiring floating voltage, Odd/Even/CF signals requiring GDN voltage and Acorn requiring AC voltage. Therefore, the control unit 223 controls the control terminals of switches 2211-2216 to make the input terminals and the output terminals of switches 2211-2213 conductive, and make the input terminals and the output terminals of switches 2214-2216 cut off. Thus, switches 2211-2213 output drive voltage and switches 2214-2216 have no output. The voltage-application units respectively connected to switches 2211-2213 receive the drive voltage and convert the drive voltage into corresponding voltage. That is, voltage-application unit 231 converts the drive voltage into floating voltage, voltage-application unit 232 converts the drive voltage into GND voltage and voltage-application unit 233 converts the drive voltage into AC voltage. Finally, according to the first voltage-application manner, the floating voltage, GND voltage and AC voltage are outputted to corresponding signals of substrate 30. In other words, R/G/B signals receive floating voltage, Odd/Even/CF signals receive GNS voltages and Acorn signal receive AC voltage.

If another voltage-application drive manner is required to supply voltage to substrate 30 after the first voltage-application drive manner supplies voltage to substrate 30, the voltage-application drive system 20 will automatically switch the voltage-application drive manner to supply drive voltage to substrate 30 corresponding to another voltage-application drive manner. Specifically, when substrate 30 uses the fourth voltage-application manner of table 1, then the user selects the first voltage-application manner in table 1. The touch control unit 222 receives the selection of the fourth voltage-application manner inputted by the user and transmits the selected voltage-application manner to the control unit 223. According to the stored voltage-application manner, the control unit 223 determines that the voltage distribution required by the fourth voltage-application manner is: R1G/B signals requiring GND voltage, Odd/Even signals requiring DC voltage and Acorn /CF signals requiring synchronous AC voltage. Therefore, the control unit 223 controls the control terminals of switches 2211-2216 to make the input terminals and the output terminals of switches 2212, 2214, 2215 conductive, and make the input terminals and the output terminals of switches 2211, 2213, 2216 cut off. Thus, switches 2212, 2214, 2215 output drive voltage and switches 2211, 2213, 2216 have no output. The voltage-application units respectively connected to switches 2212, 2214, 2215 receive the drive voltage and convert the drive voltage into corresponding voltage. That is, voltage-application unit 232 converts the drive voltage into GND voltage, voltage-application unit 234 converts the drive voltage into DC voltage and voltage-application unit 235 converts the drive voltage into synchronous AC voltage. Finally, according to the fourth voltage-application manner. The DC voltage, OND voltage and synchronous AC voltage are outputted to corresponding signals of substrate 30.

The other voltage-application drive manners are similar, and thus the description is omitted here.

As such, the voltage-application drive 20 of the present invention can automatically switch voltage-application drive manner when the user select different voltage-application drive manner. Therefore, no additional purchase of voltage-application module is required, and the cost is reduce and the efficiency is improved as well as the flexibility of the manufacturing process.

Figure 4:
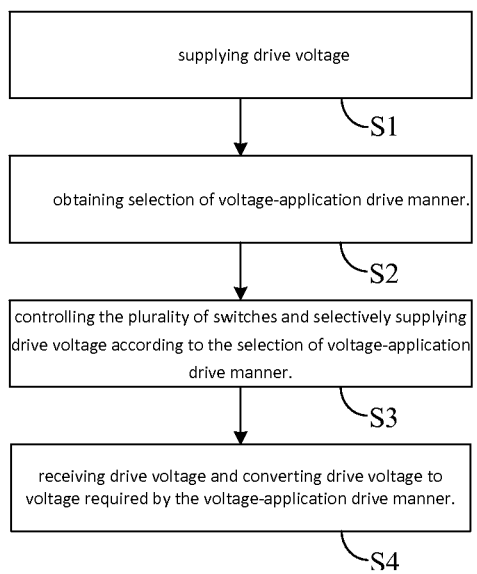
FIG. 4 is a flowchart of a voltage-application drive method of the second embodiment according to the present invention.

Referring to FIG. 4, FIG. 4 is a flowchart of a voltage-application drive method for a voltage-application drive system of the second embodiment according to the present invention, wherein the voltage-application drive system comprises a plurality of switches. The voltage-application drive method of the present invention comprises the following steps of:

Step S1: supplying drive voltage.

Step S2: obtaining selection of voltage-application drive manner.

In step S2, a plurality of voltage-application drive manners is disposed in advance for the user to select.

Step S3: controlling the plurality of switches and selectively supplying drive voltage according to the selection of voltage-application drive manner.

In step S3, a plurality of voltage-application drive manners is stored in advance, wherein the voltage-application drive manner comprises the voltage required by the voltage-application drive manners.

Specifically, based on the voltage-application drive manner, the voltage required by the voltage-application drive manner is determined and then the switches are controlled to be conductive or cut off according to the voltage-application drive manner to selectively supply drive voltage.

Step S4: receiving drive voltage and converting drive voltage to voltage required by the voltage-application drive manner.

In step S4, the voltage required by the voltage-application drive manner comprises: floating, ground (GND), AC, DC, synchronous AC and synchronous DC.

The theory of voltage-application drive manner is as described in the embodiment of FIG. 2, and the description is omitted here.

In summary, the voltage-application drive system of the present invention comprises a power module, a switching module and a voltage-application module, wherein the switching module comprises a plurality of switches and the voltage-application module comprises a plurality of voltage-application units: switching module receiving selection of voltage driver manner from user and controlling the plurality of switches and selectively supplying drive voltage according to the selection of voltage-application drive manner; the voltage-application unit receiving the drive voltage and converting the drive voltage into voltage required by the selection of voltage-application drive manner. As such, the present invention can automatically switch to different voltage-application drive manner according to different selections from users. Therefore, it is not necessary to purchase a plurality of voltage-application modules so as to reduce manufacturing cost improve production efficiency and improve the flexibility of manufacturing process.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A voltage-application drive system, which comprises:
a power module;
a voltage-application module; and
a switching module, comprising:
a switch unit comprising a plurality of switches, wherein each of the switches comprises an input terminal connected to the power module and an output terminal connected to the voltage-application module, and ON and OFF of each of the switches is independent from other switches;
a touch control unit; and
a control unit connected to the touch control unit and the switch unit;
wherein, the voltage-application module comprises a plurality of voltage-application units same as number of the switches; and the power module supplies one drive voltage;
wherein, the touch control unit receives a selection of voltage-application drive manner inputted by user, the control unit controls the ON and OFF of the switches according to the selection of voltage-application drive manner to selectively supply the drive voltage to the voltage-application units, and the voltage-application drive manner defines at least one voltage that should be outputted from the voltage-application units;
wherein, the voltage-application units receive the drive voltage and convert the drive voltage to the voltage required to be outputted from the voltage-application units as defined by the voltage-application drive manner
wherein, at least two switches are turned on at the same time according to the selection of the voltage-application drive manner.

2. The voltage-application drive system as claimed in claim 1, characterized in that the control unit stores a plurality of voltage-application drive manners.

3. The voltage-application drive system as claimed in claim 1, characterized in that the plurality of voltage-application units and the plurality of switches are electrically connected in a one-on-one manner.

4. The voltage-application drive system as claimed in claim 3, characterized in that the voltage defined by the voltage-application drive manner comprises:
floating, ground (GND), AC, DC, synchronous AC and synchronous DC.

5. The voltage-application drive system as claimed in claim 4, characterized in that the voltage-application units comprise a floating voltage-application unit, a GND voltage-application unit, an AC voltage-application unit, a DC voltage-application unit, a synchronous AC voltage-application unit and a synchronous DC voltage-application unit.

6. A voltage-application drive system, which comprises: a power module, a switching module and a voltage-application module; wherein the switching module comprises a switch unit and the switch unit comprises a plurality of switches wherein ON and OFF of each of the switches is independent from other switches; the voltage-application module comprises a plurality of voltage-application units same as number of the switches; wherein:
the power module supplies one drive voltage;
the switching module is connected to the power module and the voltage-application module respectively, the switching module receives a selection of voltage-application drive manner inputted by user and controls the ON and OFF of the switches according to the selection of voltage-application drive manner to selectively supply drive voltage to voltage-application units, wherein the voltage-application drive manner defines at least one voltage that should be outputted from the voltage-application units;

the voltage-application units receive the drive voltage and convert the drive voltage to voltage required to be outputted from the voltage-application units as defined by the voltage-application drive manner, wherein, at least two switches are turned on at the same time according to the selection of the voltage-application drive manner.

7. The voltage-application drive system as claimed in claim 6, characterized in that each of the switches comprises an input terminal and an output terminal, with the input terminal connected to the power module and the output terminal connected to the voltage-application module; when the input terminal and the output terminal are conducted, the switch outputs the drive voltage, and when the input terminal and the output terminal are cut off, the switch does not output the drive voltage.

8. The voltage-application drive system as claimed in claim 6, characterized in that the switching module further comprises a touch control unit, for receiving the selection of voltage-application drive manner inputted by user.

9. The voltage-application drive system as claimed in claim 8, characterized in that the switching module further comprises a control unit, electrically connected to the touch control unit and the switches, the control unit receives the selection of voltage-application drive manner inputted by user and controlling the ON and OFF of the switches according to the selection of voltage-application drive manner to selectively supply the drive voltage to the voltage-application units.

10. The voltage-application drive system as claimed in claim 9, characterized in that the control unit stores a plurality of voltage-application drive manners.

11. The voltage-application drive system as claimed in claim 9, characterized in that the plurality of voltage-application units and the plurality of switches are electrically connected in a one-on-one manner.

12. The voltage-application drive system as claimed in claim 9, characterized in that the voltage required to be outputted from the voltage-application units as defined by the voltage-application drive manner comprises: floating, ground (GND), AC, DC, synchronous AC and synchronous DC.

13. The voltage-application drive system as claimed in claim 9, characterized in that the voltage-application units comprise a floating voltage-application unit, a GND voltage-application unit, an AC voltage-application unit, a DC voltage-application unit, a synchronous AC voltage-application unit and a synchronous DC voltage unit.

* * * * *